United States Patent [19]

Michimae

[11] Patent Number: 5,195,449
[45] Date of Patent: Mar. 23, 1993

[54] DRY DISTILLATION TYPE INCINERATOR

[76] Inventor: Kiyoharu Michimae, 4-10, Kofu 2-chome, Fushiki, Takaoka-shi, Toyama-ken 933-01, Japan

[21] Appl. No.: 835,124

[22] Filed: Feb. 12, 1992

[51] Int. Cl.⁵ .................................................. F23G 5/00
[52] U.S. Cl. ..................................... 110/257; 110/225; 110/229; 110/256; 110/291
[58] Field of Search ............... 110/256, 257, 291, 229, 110/225, 235

[56] References Cited

U.S. PATENT DOCUMENTS

| | | | |
|---|---|---|---|
| 4,172,425 | 10/1979 | Sheridan | 110/257 |
| 4,452,154 | 6/1984 | Kono et al. | 110/256 X |
| 4,495,872 | 1/1985 | Shigaki | 110/257 X |
| 4,732,092 | 3/1988 | Gould | 110/229 |
| 5,010,828 | 4/1991 | Mallek | 110/256 |

*Primary Examiner*—Edward G. Favors
*Attorney, Agent, or Firm*—Flynn, Thiel, Boutell & Tanis

[57] ABSTRACT

A distillation type incinerator generates gas containing much combustible gas owing to restricted air introduction at feeding the combustible matters thereto and minimum necessary supply of air for combustion and dry distillation, and generates residue which contains less unburned matters and can be taken out in lumps, so as to reduce the amount of waste and facilitate the recycle of useful metals. The dry distillation type incinerator comprises a feeding tower which is composed of a hopper and a body, the hopper composed of an inlet and a conveyor, the body which is composed of plural dampers, an inclined multistage furnace integrated with the feeding tower, the inclined multistage furnace composed of a first stage chamber, a middle stage chamber and a last stage chamber which are gradually inclined forward in the descending order, characterized in that a first gage is provided between the last stage chamber and the middle stage chamber and a second gate is provided at a discharge port of the last stage chamber, each chamber has furnace floor, which is inclined proportionally to the inclination of each chamber, and pushers which are provided for raking out unburned matters or residue along the inclined furnaces, the first stage chamber has an exhaust pipe fixed to an upper end thereof for exhausting a combustion gas, the second stage chamber has an air inlet for introducing air thereinto, the third stage chamber has an air inlet and a smoke duct for discharging the combusting gas.

2 Claims, 1 Drawing Sheet

DRY DISTILLATION TYPE INCINERATOR

BACKGROUND OF THE INVENTION

1. Field of Industrial Application

The present invention relates to a dry distillation type incinerator for drying mainly high polymer trash or other trashes such as lumber or paper scraps (hereinafter referred to as combustible matters) while combusting the same, for thereby separating combustible gas from residue.

2. Prior Art

Although high polymer products are used in many fields, the recycling or disposal of their waste can not be effectively carried out by a single device or incinerator since it is difficult to secure a space for finally disposing such products.

Conventional incinerators for high polymer waste generally employed a system of combusting the waste comprising the steps of lighting (igniting) combustible matters, supplying air thereto and expediting the combustion by the heat of combustion. Among them, some simply threw away the gas generated in the combustion, and residue after combustion, and the other dried the combustible matters by distillation to make use of the generated gas and threw away the residue. Some were provided with an auxiliary heating device.

Various means for drying the waste by distillation have been proposed for preventing the gas generated by combustion of the combustible matters from letting off the air, to thereby pollute the environment and disabling the recycling of the resources. However, there was such a problem in the conventional distillation type incinerators with respect to their usefulness that they could not produce enough combustible gas having high calorie because too much air was supplied to the incinerator for combusting the combustible matters.

Heating means is employed for increasing the ratio of the combustible gas, but it requires a subsidiary fuel which entails economical problems, so that it is desirable to completely dry the combustible matters by distillation using the heat generated by combustion of the combustible matters.

The residue is generated by incomplete combustion of the combustible matters and includes a compound of carbon, nonorganic substances and metals, which contains many unburned matters, since it was taken out from the incinerator before it was completely combusted and too bulky to be taken out in lumps. As a result, it was difficult to secure a place to dispose thereof and take out useful metals therefrom.

SUMMARY OF THE INVENTION

In view of the problems set forth above, it is the object of the present invention to provide a dry distillation type incinerator for generating gas containing much combustible gas owing to restricted air introduction at the time of feeding the combustible matters thereto and minimum necessary supply of air for combustion or dry distillation, and for generating residue which contains less unburnt matters and can be taken out in lumps, so as to reduce the amount of wastes and facilitate the recycling of useful metals.

In order to achieve the above object, the dry distillation type incinerator comprises a feeding tower which is composed of a hopper and a room, the hopper composed of an inlet and a conveyor, the room which is composed of plural dampers, each damper having an opening through which combustible matters are thrown and stored thereon, an inclined multistage furnace integrated with the feeding tower, the inclined multistage furnace composed of a first stage chamber serving as mainly a dry incinerator chamber, a middle stage chamber serving as mainly a combustible chamber and a last stage chamber serving as a chamber for melting residue therein, which are gradually inclined forward in the descending order, characterized in that a first gate is provided between the last stage chamber and the middle stage chamber and a second gate is provided at a discharge port of the last stage chamber, each chamber has furnace floor, which is inclined proportionally to the inclination of each chamber, and pushers, which are provided for raking out unburned matters or residue along the inclined furnaces, the first stage chamber has an exhaust pipe fixed to an upper end thereof for exhausting a combustion gas, the second stage chamber has an air inlet for introducing air thereinto, the third stage chamber has an air supply port and a smoke duct for discharging the combusting gas.

When combustible matters are thrown through the inlet into the feeding tower of the dry distillation type incinerator constructed as set forth above, they are held by the uppermost dumpers, and thereafter transferred downward by alternately opening and shutting the successive dumpers. During this process the air and moisture harmful for dry distillation is removed from the combustible matters which temporarily stay on each dumper by the heat conducted from the residue in the inclined multistage furnace. Thereafter the combustible matters are dropped into the inclined multistage furnace.

When the combustible matters are fed to the inclined multistage furnace, they are dried by distillation in the uppermost first stage chamber and the gas generated thereby is discharged through the exhaust pipe. Then, the dried combustible matters are fed to the middle stage chamber by pushers and combusted therein. The heat and inert gas generated by the combustion are conducted to the first stage chamber for dry distillation.

In the first stage chamber, the pushers stir the combustible matters so as to expose them to the inert gas uniformly. In the middle stage chamber, the pushers stir the combustible matters so as to mix them uniformly with air for the purpose of complete the combustion and increasing the generation of the inert gas which is suitable for the dry distillation.

The residue generated by the combustion is fed through the gate to the last stage chamber by the pushers, where it is melted. When the both gates are shut and air is uniformly mixed in the residue by stirring the same by the pushers, the residue is combusted by the remaining heat and is melted by the heat generated by the combustion so that the exhaust gas is discharged through the smoke duct.

The melted residue is discharged from the discharge outlet in melted state or after solidification, in which there scarcely remain unburned matters. It is retrieved as a mass of a small amount of carbon, nonorganic substance, metals, etc.

Inasmuch as the each stage chamber has an inclined furnace floor, on which pushers operate, the combustible matters and residue can be effectively stirred thereby.

PREFERRED EMBODIMENT OF THE INVENTION

Figure 1:
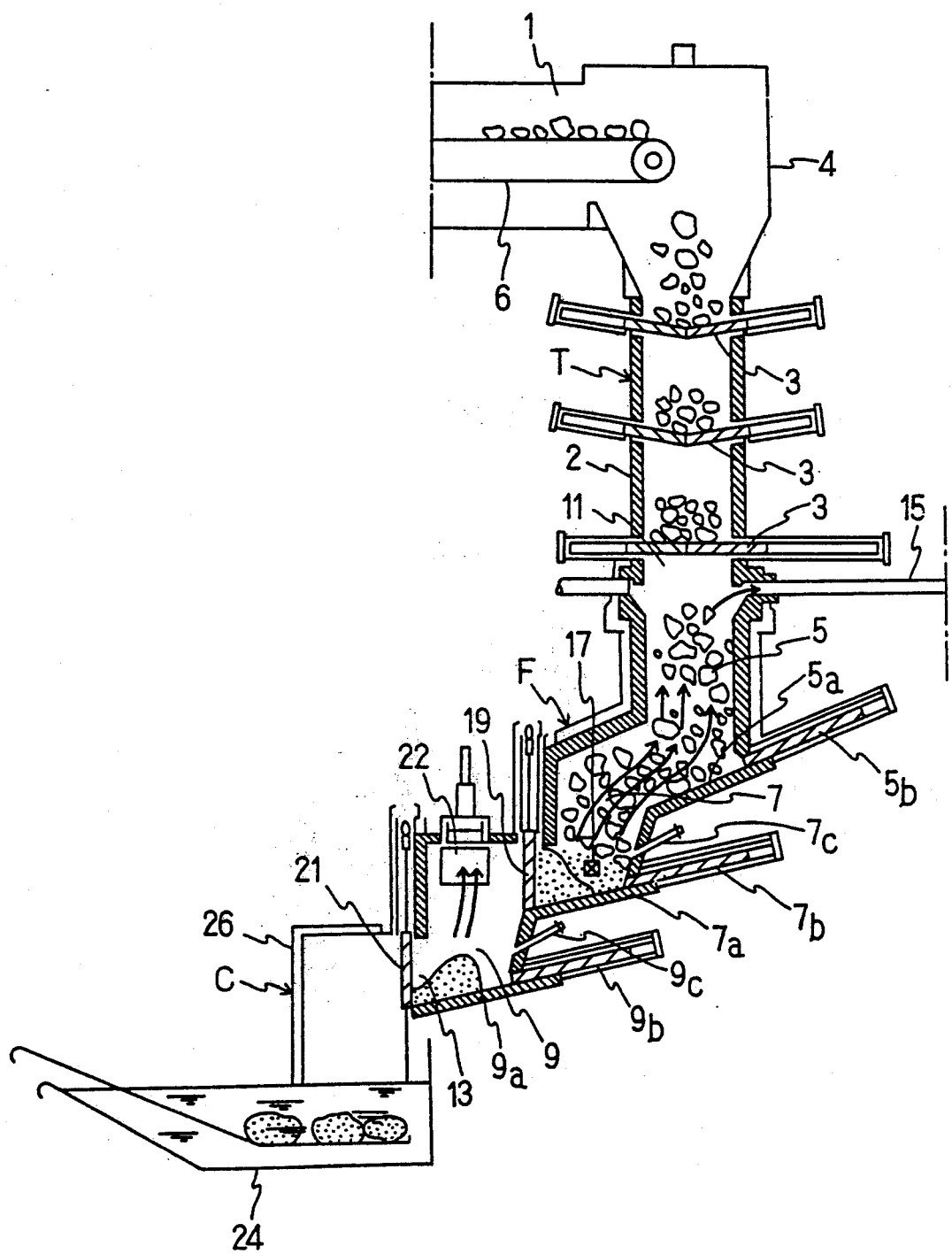
FIG. 1 is a cross sectional view showing an embodiment of the present invention.

A dry distillation type incinerator according to a preferred embodiment of the present invention will be described hereinafter with reference to a single drawing.

The dry distillation type incinerator comprises a combustible matter feeding tower T, an inclined multistage furnace F disposed thereunder and a residue cooling chamber C disposed under the inclined multistage furnace F.

The feeding tower T is composed of a body 2 of chimney shape and a hopper 4 which is disposed at the top end of the body 2. The hopper 4 includes an inlet 1 from which the combustible matters are thrown, a feeding conveyor 6 for conveying the combustible matters and transferring them to the body 2. The body 2 is equipped with three dumpers 3, 3, 3 which are opened at an interval of three hours successively from top to bottom, i.e. in the descending order, so as to transfer the combustible mattes in turn. Consequently, air is rarefied and moisture content is evaporated from the combustible matters during the time when the combustible matters stay in the spaces between the dumpers 3, 3, 3 due to the heat conducted from the multistage furnace F, so that the combustible matters, from which moisture content is evaporated, are fed to the inclined multistage furnace.

The inclined multistage furnace F is composed of the first stage chamber 5, the middle stage chamber 7 and the last stage chamber 9 from top to bottom, wherein these chambers are inclined gradually forward in the descending order and have forward lower inclined furnace floors 5a, 7a and 9a respectively. These chambers also have pushers 5b, 7b and 9b at the rear walls thereof for raking out or stirring the combustible matters or the residue along the inclined furnace floors 5a, 7a and 8a.

The first stage chamber 5 has an opening at the top thereof, through which the combustible matters drop from the feeding tower T and stay on the furnace floor 5a. During the stay on the furnace floor 5a, the combustible matters are distilled. A combustible gas generated by the dry distillation is supplied to other equipment such as boilers, smelting furnaces, etc. or to distillation devices through an exhaust pipe 15 connected to the upper end of the first stage chamber 5. The combustible matters collapsed by the dry distillation drop into the middle stage chamber 7 or are raked out by the pusher 5b so as to be fed into the middle stage chamber 7 where they are combusted.

The middle stage chamber 7, which serves as a combustion chamber, has a downward inclined air inlet 7c at the rear wall thereof and a gate 19 between the last stage chamber 9 and itself. The middle stage chamber 7 also has an ignition device 17 for igniting the combustible matters at the beginning of operation of the dry distillation type incinerator.

In the middle stage chamber 7, the combustible matters are stirred to be mixed with air by the pusher 7b so that they are combusted completely and generate inert gases, which go up to the first stage chamber 5 together with the conducted heat generated by the complete combustion in the middle stage chamber 7. As a result, the dry distillation is carried out by both the inert gases and heat for thereby generating a concentrated combustible gas from the combustible matters fed from the feeding tower T, which contain little air and moisture.

Inasmuch as the completely combusted residue is pushed against the gate 19 by the raking out operation of the pusher 7b and remains much there, the gate 19 is sometimes opened to rake out the residue by the pusher 7b into the last stage chamber 9 so as to melt the reside therein.

The heat generated by the combustion of the unburned matters remaining in the residue is used for melting the residue in the last stage chamber 9. For this purpose, a downward inclined air inlet 9c is provided on the rear wall of the last stag chamber 9, and a gate 21 is provided at the discharge port 13. Both gates 19 and 21 are shut during the combustion for melting the residue. A smoke duct 22 which is adjustable by a damper is provided at the side portion of the last stage chamber 9 for discharging the combustion gas.

In the last stage chamber 9, the residue is stirred and mixed with air by the pusher 9b so that unburned matters are almost completely combusted and the cinders thereof are melt by the heat generated by the combustion. The melt residue may be poured down into the cooling chamber C or may be transferred thereto by the pusher 9b through the opened gate 21 after solidification.

The cooling chamber C is water-cooled and comprises a hermetically sealed chamber 26 formed on a water tank 24. Although the cooling chamber C is not always to be hermetically sealed but can be air-cooled, such hermetically sealed chamber can produce emulsion slags.

The present invention has the following excellent effects.

1) Inasmuch as air and moisture which obstruct dry distillation are removed from the combustible matters in the feeding tower and the combustible matters are combusted completely in the middle stage chamber with a small amount of air so as to produce only inert gases effective for dry distillation which is supplied to the first stage chamber, a combustible gas of high density and high calorie which does not contain air is generated in the first stage chamber by dry distillation, and is retrieved by way of an exhaust pipe, so that the waste can be recycled as a gas or a distilled oil therefrom.

2) The residue produced by a complete combustion in the middle stage chamber is fed to the last stage chamber, where it is melted and solidified into blocks of a small amount of carbon, nonorganic substances, metals, etc., which have scarcely remaining unburnt matters. As a result, its disposal can be easily secured since it is not bulky and each component of the waste can be retrieved separately for recycling thereof so as to increase the value added thereto.

3) Inasmuch as the furnace has a shape substantially extending vertically, it does not require a large space although the combustible gas can be effectively generated by dry distillation and the residue in a form suitable for disposal or recycling can be collected, so that the site for disposing the wastes can be easily secured.

What is claimed is:

1. A dry distillation type incinerator comprising:
a feeding tower which is composed of a hopper and a body;
the hopper composed of an inlet and a conveyor;

the body which is composed of plural dampers, each damper having an opening through which combustible matters are thrown and stored thereon;

an inclined multistage furnace integrated with the feeding tower, the inclined multistage furnace composed of a first stage chamber serving as mainly a dry incinerator chamber, a middle stage chamber serving as mainly a combustible chamber and a last stage chamber serving as a chamber for melting residue therein, which chambers are gradually inclined forward in the descending order, characterized in that:

a first gate is provided between the last stage chamber and the middle stage chamber and a second gate is provided at a discharge port of the last stage chamber, each chamber has a furnace floor, which is inclined proportionally to the inclination of each chamber, and pushers which are provided for raking out unburned matters or residue along the inclined furnace floors, the first stage chamber has an exhaust pipe fixed to an upper end thereof for exhausting a combustion gas, the second stage chamber has an air inlet for introducing air thereinto, the third stage chamber has an air inlet and a smoke duct for discharging the combusting gas.

2. A dry distillation type incinerator according to claim 1, further comprising a cooling chamber provided under the inclined multistage furnace.

* * * * *